United States Patent [19]
Pegram, Sr.

[11] Patent Number: 5,979,956
[45] Date of Patent: Nov. 9, 1999

[54] PULL STRING PADDLE & GUIDE

[76] Inventor: Robert H. Pegram, Sr., 1042 Old Boiling Springs Rd., Shelby, N.C. 28152

[21] Appl. No.: 09/032,873

[22] Filed: Mar. 2, 1998

[51] Int. Cl.$^6$ .......................................................... B25J 1/04
[52] U.S. Cl. .................................... 294/19.1; 254/134.3 R
[58] Field of Search ............ 294/19.1, 24; 254/134.3 R, 254/134.3 PA, 134.3 FT; 114/221 R, 230

[56] References Cited

U.S. PATENT DOCUMENTS

| | | | |
|---|---|---|---|
| 2,155,053 | 4/1939 | Kuenzi | 254/143.3 PA |
| 3,072,429 | 1/1963 | Stipan | 294/19.1 |
| 3,549,128 | 12/1970 | Homiak et al. | 254/134.3 FT |
| 4,114,938 | 9/1978 | Strader | 294/19.1 |
| 4,249,763 | 2/1981 | Provencher et al. | 294/19.1 |
| 4,460,159 | 7/1984 | Charlebois et al. | 254/134.3 R |
| 4,469,361 | 9/1984 | Pendergraft | 294/19.1 |
| 4,977,846 | 12/1990 | Landa et al. | 114/230 |
| 5,054,829 | 10/1991 | Olsen | 294/19.1 |
| 5,538,302 | 7/1996 | Travis | 294/24 |
| 5,560,975 | 10/1996 | Casper | 428/99 |
| 5,622,399 | 4/1997 | Albright | 294/24 |
| 5,626,377 | 5/1997 | Carroll, Jr. et al. | 294/19.1 |
| 5,676,084 | 10/1997 | Palmer et al. | 114/230 |
| 5,742,220 | 4/1998 | Scherer | 294/19.1 |

Primary Examiner—Dean J. Kramer
Assistant Examiner—Paul Chin
Attorney, Agent, or Firm—Patent & Trademark Services; Thomas Zack; Joseph H. McGlynn

[57] ABSTRACT

An apparatus whereby a single user can install an overhead electrically conducting wire, between and around obstacles, such as open ceiling heating and air conditioning ducts. The apparatus has a rigid electrically nonconductive thin lightweight paddle having a closed pliable loop at one end, a lightweight vertical support pole with an upper paddle guide attached to it and a depending pull paddle attached string. A hole near one of the paddle's ends allows an upper portion of the paddle guide to engage the side of the paddle while another segment of the guide acts to vertically support the paddle. The pull string is attached to the paddle near its hole and when tension is applied, or subsequently released, causes the vertically supported paddle and its attached looped end to move up or down. At the other end of the pull string the trailing electrically conductive electrical wire to be installed overhead is attached. A leg portion of the paddle guide is used to move the paddle and its looped end to one side or the other by rotating the supporting pole. A user on the floor can thus move the overhead paddle's looped end up or down—by either the pull string or moving the pole, or both, and side ways by engaging part of the paddle guide with the paddle side as the pole is turned.

6 Claims, 1 Drawing Sheet

US 5,979,956

PULL STRING PADDLE & GUIDE

BACKGROUND OF THE INVENTION

The placement of electrically conductive wire, such as wire that carries electrical signals to operate computers, telephones, pager speakers, etc. can be a time consuming activity. This is especially true when the wire is to be placed in a high opened ceiling with exposed joists, rafters, heating/cooling ducts, pipes and other interfering objects. Normally, some type of pull string is attached to the wire to be installed and the string placed over the interfering ceiling object. Next, the pull string is pulled bring with it the attached wire to be installed over the interfering object.

In this placement process for the pull string some type of climbing is frequently involved. This may require the user to get up on a stepladder or a frame ladder to place the pull string over the interfering object. Also used for this purpose have been mechanical lifts with a lift operator and the string installer. In either event, the elevated installer is exposed to the danger of falling which can be a frightening experience especially when working over machinery, furnaces or any other dangerous objects below.

When it was desired to provide the wire installation without elevating the installer, several types of methods have been used. In one a user simply ties a string to a roll of tape and throws the tape from the floor over the higher interfering ceiling object. This throw method proved somewhat ineffective in many cases due to obstructing overhead objects and poor aim from the thrower. Therefore, installers, when remaining on the floor, started to use fiber glass poles to place the tape and its string over the interfering overhead objects. This pole installation method was further modified by using the pole with a piece of 6 gauge copper wire looped at its end that had the string tied to the loop. This modified installation method was used with more success for several years.

The present invention is a further improvement on the prior art pole/loop method of installation wherein a lightweight, nonconductive, rigid paddle structure is interposed between the pole's upper end and the wire loop while a unique paddle guide and pull string is employed near the paddle's opposite end as further described in this specification.

DESCRIPTION OF THE PRIOR ART

In addition to the methods previously discussed to install conductive wires overhead, the prior patent art discloses related apparatus. For example, in U.S. Pat. No. 5,054,829 to Olsen a wire placing device is disclosed which has a pole with a rod on which a disk with the wire can slide. By providing an upward thrust to the pole the disk slides off and over the object upon which the wire is to be installed.

In the Travis invention (U.S. Pat. No. 5,538,302) a pole with an end retractable self-storing loop is used move objects.

The Casper invention (U.S. Pat. No. 5,560,975) permits a pole user to use a special adaptor which can be mounted on a supporting member and used to hang objects therefrom.

And in the Albright reference (U.S. Pat. No. 5,622,399) a remote tie-off adaptor and snap hook attachment device which uses an extendible pole is described. The present invention differs from this and the known prior art by providing for an overhead wire installation system which can be used by one person that utilizes a rigid paddle member with an end wire loop and an opposite pole supported paddle end having a guide member and a pull string all as more further set forth in this specification.

SUMMARY OF THE INVENTION

This invention relates to an overhead guide which permits the overhead installation of wire by a single user. A vertical disposed support pole with an upper guide is used to impart up/down and sideways motion to the paddle while a pull string permits the paddle's other end to be moved either under tension or by releasing applied tension. A closed flexible loop is fixed to the paddle's end opposite that of the pole support.

It is the primary object of the present invention to provide for an improved guide device for placing a wire in an overhead position.

Another object is to provide for such a device wherein a rigid non electrically conductive paddle in used in conjunction with a guide loop and pole guide.

These and other objects and advantages of the present invention will become apparent to readers from a consideration of the ensuing description and the accompanying drawings.

DESCRIPTION OF THE PREFERRED EMBODIMENT

Figure 1:
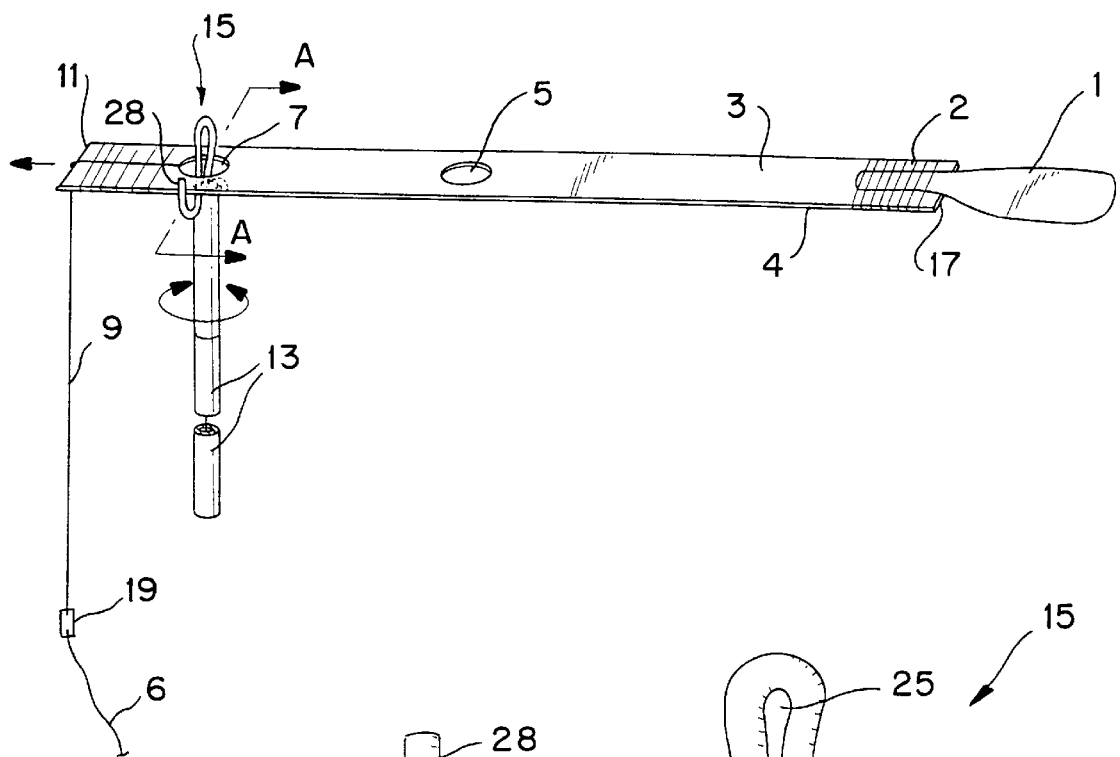
FIG. 1 is a side perspective view of the invention's preferred embodiment.

FIG. 1 is a side perspective view of the invention's preferred embodiment. Starting at the right side there is a closed flexible wire loop 1 whose two free ends are fixed by staples and tape 2 near one end of a rigid pull string paddle 3. This loop 1 can be bent to different shapes (e.g., a long narrow loop) to accommodate different sized overhead openings such as between duct work. It thus provides a flexible paddle end, as will be explained hereafter, which can be pulled to pull along the electrically conductive wire 6 to be installed over the overhead obstacles such as duct work, etc.

The paddle 3 consists of a relatively thin (dimension 4) elongated lightweight, rigid rectangular surface having two spaced circular holes 5 and 7 extending completely through the paddle's thickness. Both of the holes are closer to the paddle end opposite from the end having the closed loop 1. To avoid the possibility of electrical shock, the rigid paddle 3 should be made of an electrically poor or nonconductive material such as wood, fiber glass or plastic.

Extending from the paddle end opposite the loop is a depending pull string 9 made of a strong polyester line material. String 9 is taped or otherwise fixed to the nonconductive material such as wood, fiber glass or plastic.

Extending from the paddle end opposite the loop is a depending pull string 9 made of a strong polyester line material. String 9 is taped or otherwise fixed to the paddle's surface and extends from the paddle's end 11 (opposite the loop end) over the paddle's surface and into the hole 7. Also shown in this figure is the telescopic hollow top opened fiber glass tubular pole 13 whose upper end mounts and engages the mounted paddle guide 15, shown in greater detail in FIG. 2.

Normally the elongated rectangular paddle 3 extends from about 24 to 48 inches in overall length (from its end 11 to its opposite free end 17) and may have a width of about 1¾ inches and a thickness (dimension 4) of ¼ of an inch. In one embodiment of the invention, the hole 7 was ¾ of an inch in diameter and inset 4 inches from paddle end 11. The second hole 5 in the same embodiment was also ¾ of an inch in diameter and set in 8 inches from the hole 7 on center. The end wire loop 1 in that embodiment was a 12 gauge copper wire that extended 6 inches out from the paddle free end 17. The telescoping fiber glass pole had an extendible length of 29 feet. The paddle depending polyester string 9 was a 200 pound test line.

Figure 2:
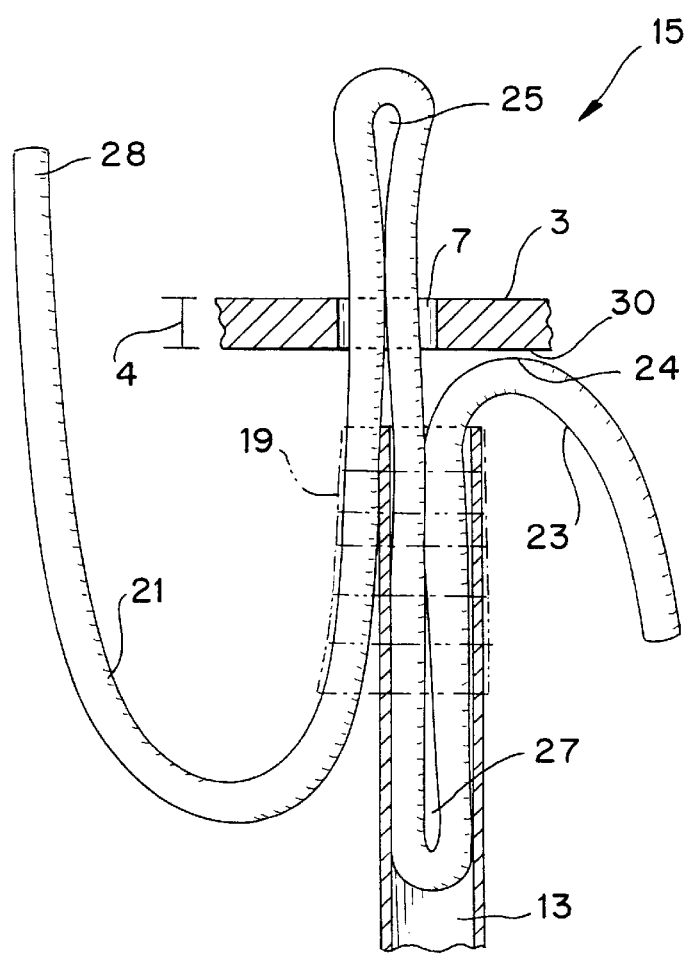
FIG. 2 is an enlarged side view of the paddle guide used in the FIG. 1 embodiment as viewed along line A—A through paddle hole 7.

FIG. 2 is an enlarged cross sectional side view of the paddle 3 and pole 13 with the guide 15 as viewed in the direction of arrows A—A through the hole 7 in paddle 3. For the mention specific embodiment, this guide 15 measured about 3½ inches wide by 4½ inches in overall high.

Part of bent wire guide 15 is fitted inside the hollow top opened end of pole 13, wide by 4½ inches in overall high.

Part of bent wire guide 15 is fitted inside the hollow top opened end of pole 13, shown in cross section in this view, at the pole's upper portion. Lateral support for the guide is also provided by using vinyl tape 19 or some other type of fastener which wraps around both the guide and pole as shown. The guide itself consists of a single wire segment bent to form two opposite hooked segments 21 and 23 with two intermediate spaced eyelet loops 25 and 27 there between. The upper end of the larger of the two eyelet loops 25 is opened upwardly and shown fitted into the paddle hole 7 and extending through the thickness 4 of paddle 3.

The configuration and size of loop 25 is such that it may be removed and reinserted into either of the two paddle holes 5 or 7 as the paddle is moved overhead. This hole fit between the loop and the paddle hole is not a tight fit thus permitting the rotation of the supporting lower pole 13 to not be imparted to the overhead supported paddle as the pole is moved. In this manner the pole forms a lower pivotal paddle point support for the supported overhead higher paddle.

The lower smaller eyelet loop 27 sits inside the hollow pole's opened top and the guide 15 is held to the pole's upper portion by this insertion and the use of exterior vinyl tape 19 (partially shown) wrapped around the pole abutting leg of hook segment 21 and completely around the pole as shown by the dotted lines. The lower smaller downwardly opening hook segment 23 has an uppermost bight portion whose outer upper surface 24, when the pole is raise to contact the paddle, bears against the bottom of paddle 3 at downwardly opening hook segment 23 has an uppermost bight portion whose outer upper surface 24, when the pole is raise to contact the paddle, bears against the bottom of paddle 3 at a point 30 to permit the pole to support the paddle vertically and control its movement up or down by raising and lowering the pole, respectively.

In use, the pull string 9 is attached to the paddle at one end and the trailing conductive wire 6 to be installed is attached to the other end of string 9. The wire 6 may be fastened to string 9 by vinyl tape 19, as shown, or tied end-to-end thereto by a knot. Next, the paddle and the pull string are elevated with paddle guide 15 placed in hole 7 or 5 while the upper part of hook segment 23 bears against the lower surface of paddle 3 as shown in FIG. 2.

To provide stability and guidance in placing the paddle end 17 and the loop 1, tension is placed on the pull string 9. Up and down movement of this paddle's loop end (17) is applied by providing tension (up) on attached pull string 9 or releasing any applied tension (down). Should the elongated paddle need a sideways orientation adjustment, the guide's upper end portion 28 of guide hook 21 may be brought in contact with the paddle's side (defined by dimension 4) by twisting the paddle support pole 13 until the guide portion 28 touches the side of the paddle. Depending on what side of the paddle guide portion 28 is on, rotation movement may be imparted to the rigid paddle and consequently its free end 17. By rotating the support pole 13 clockwise (c) in FIG. 1, the upper end portion 28 engages the paddle's left side, as view from end 11 towards end 17, and moves the attached paddle loop end 1 to the right. clockwise (c) in FIG. 1, the upper end portion 28 engages the paddle's left side, as view from end 11 towards end 17, and moves the attached paddle loop end 1 to the right.

When upper guide portion 28 is on the right side of the paddle in the same figure, it could be brought to bear against the right side of the paddle by rotating the pole 13 counter-clockwise (cc) which would then cause the paddle's loop end 1 to move to the left. The second spaced hole 5 in the paddle is used when the paddle is passed over several overhead objects, such as conduits, that might be over a distance of three or four feet and obstruct the view of the hole 7 and/or loop 1. To move the paddle when this occurs, the second hole 5 (if visible) can have the guide 15 inserted into it to move the paddle in the desired orientation and direction. Clearly, longer paddles (e.g., 48 inches long) are used to pass over large overhead objects such as large heating and air conditioning ducts.

When moving the paddle to place its looped end 1, it is very important that the user (one person) control the pull string 9 while simultaneously moving the engaged support pole 13. Applying tension to the string pivots the paddle on the upright supporting pole while rotating the pole allows hook portion 28 to contact and change the angular orientation of the paddle relative to its pivot at hole 7. This manipulation of both the pole (up,down or rotation) while applying or releasing tension on string, permits a single user great latitude in the placement of the rigid light weight paddle member 3 overhead especially its end 17 with attached loop 1. There usually is ample slack in the permits a single user great latitude in the placement of the rigid light weight paddle member 3 overhead especially its end 17 with attached loop 1. There usually is ample slack in the replaceable string 9 allowing an operator to move about freely. This movement is accomplished in a relatively rapid way and thus saves labor time while lessening the danger to a user who is firmly planted on the ground during the manipulation process.

As paddle 3 is moved over the overhead obstacles, pull string 9 and the attached wire 6 are pulled along. Should the forward loop end 1 be stuck, any of the guide's protruding upper members,(i.e., outer surface of loop 25, upper surface 24 or upper hook portion 28) may be inserted into the loop 1 and be used to pull this loop and its attached paddle along over the obstacles along with the also attached pull string 9 and its trailing wire 6.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A device for installing wire in an overhead support comprising:

a rigid paddle member having a flexible loop attached at one of its ends, said paddle having a first aperture located near the end opposite the paddle end on which the loop is attached;

a lightweight paddle vertical support pole having an upper paddle guide which can engage said aperture in the paddle to permit the paddle to be vertically supported above the ground; and a flexible pull member attached to said paddle adjacent said paddle's aperture and depending therefrom, said pull member also having the wire to be installed attached to it whereby movement in several directions can be imparted to the paddle's end with the loop attached when tension is applied to the pull member and the paddle is supported by the pole's paddle guide.

2. The device as claimed in claim 1, wherein said pole paddle guide consists of a bent flexible member having two hooked segments, at least one of said hooked segments being capable of contacting a side of the paddle when another part of the guide is in the paddle's aperture to the support the paddle in a vertical position.

3. The device as claimed in claim 2, wherein said pole has a hollow opened top and said paddle guide has a looped segment, said segment being inserted into the pole's opened top and held therein.

4. The device as claimed in claim 2, wherein said pole is an electrically nonconductive telescopic pole having a hollow upper portion, said pole being made of a fiber glass material.

5. The device as claimed in claim 4, wherein said paddle is formed of a rigid lightweight material that has poor electrical conducting properties.

6. The device as claimed in claim 5, wherein said paddle has a second aperture through the paddle, said second aperture being spaced along the length of the paddle closer to the looped end from said first aperture.

* * * * *